(No Model.)
G. H. POND.
TRACTION ENGINE.
No. 433,488. Patented Aug. 5, 1890.
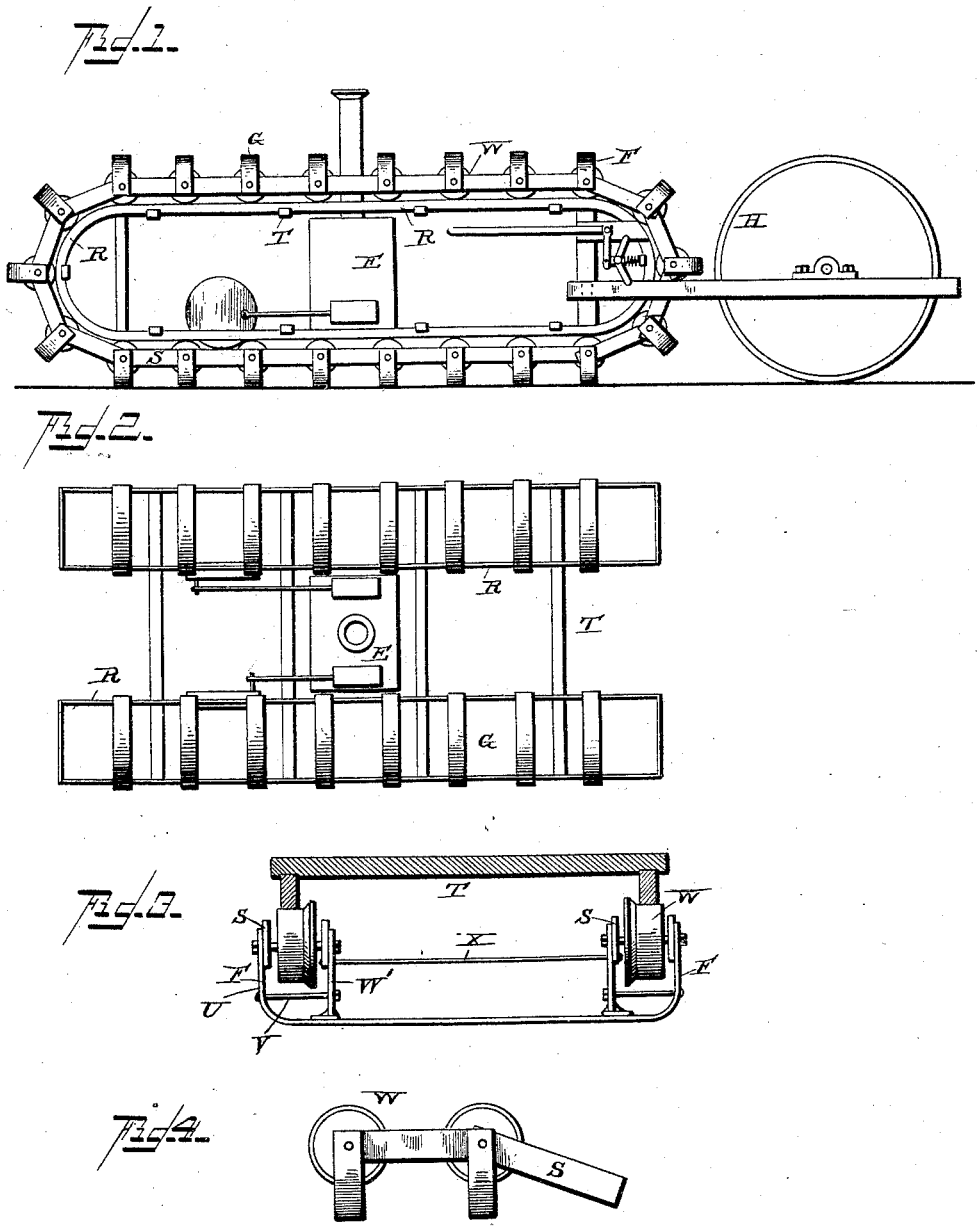
WITNESSES
F. L. Ourand
Edward Cashman
INVENTOR
Goldsbury H. Pond
by Benj. R. Catlin
Attorney

UNITED STATES PATENT OFFICE.

GOLDSBURY HARDEN POND, OF GLENS FALLS, NEW YORK.

TRACTION-ENGINE.

SPECIFICATION forming part of Letters Patent No. 433,488, dated August 5, 1890.

Application filed December 19, 1889. Serial No. 334,335. (No model.)

*To all whom it may concern:*

Be it known that I, GOLDSBURY HARDEN POND, a citizen of the United States, residing at Glens Falls, in the county of Warren and State of New York, have invented new and useful Improvements in Traction-Engines, of which the following is a specification.

My invention relates to improvements in traction-engines, the wheels of which usually rest and move upon the ground, and are thereby subject to the resistance due to their sinking in the ground or to obstacles upon its surface.

The object of the invention is to provide in that class of vehicles in which the wheels run upon endless raised tracks supporting frames and tracks, which, without undue complexity of parts, shall be sufficiently strong to support the traction-wheels of a vehicle and afford ample bearing-surface on the ground and permit ready turning. I attain these objects by the mechanism illustrated in the accompanying drawings, in which—

Figure 1 is a vertical section of the entire machine. Fig. 2 is a top view of the machine arranged for two sets of trucks and wheels and two engines. Fig. 3 is an enlarged sectional view through the center of two of the lower wheels in Fig. 1, showing the truck-frames, the endless rails, the wheels, and a tie; and Fig. 4 is an enlarged side elevation of a truck-frame with wheels and a connecting-strap.

The rails R R are endless and in the form of loops and are held parallel to each other by the ties T. (See Figs. 1 and 3.) The engines and boiler E rest on the floor, which is laid and fastened upon the ties. The lower or ground sides of the rails or loops R R rest and move on the periphery of the wheels W, (see Figs. 1 and 3,) while they support the wheels W on their upper sides (of the endless rails in Fig. 1 rest and move thereon.) The wheels are journaled in and held in place in the truck-frames F F. These frames are fastened together with the connecting-straps S S in an endless series surrounding the endless rails R R. The lower side of the truck-frames F F rest upon the ground, (or whatever the engine is passing over,) as shown in Figs. 1 and 3 at G. This lower side of each truck-frame is bent or rounded at the outside corner, as shown, so that the whole machine can readily be moved from side to side by the steering-gear (not shown) or by an independent engine upon each side of the double set of trucks and rails, as shown in Fig. 2.

In using two engines the machine can turn entirely around in a little more than its length by running one engine back and the other forward. The engine can be connected to the truck-frames and connecting-straps in any of the ordinary modes either with chain, wire, rope, or gear.

The truck-frames F consist of bars G, having upturned ends in which are supported the outer journals of the wheels. Bars or posts W' are secured to and rise from the main part of the frame parallel to its upturned ends v, and have bearings for the inner ends of the wheel-axles, which latter also hold said posts and ends in proper relative position. They are further held and supported by the parallel rods V, and the stability of the parts is yet further increased by bars X, connecting the posts.

When motion is given to the engine, the endless rails R R, with the engine and boiler, and whatever else is required thereon, move either forward or backward on the periphery of the lower series of wheels, which do not change their position until after the endless rails have passed over them. These wheels do not touch the ground, but turn on their axles in the truck-frames F F, the whole being supported by the parts G G of the truck-frames that rest upon the ground (or whatever the engine is passing over.) The truck-frames are held together by the connecting-straps and form an endless series around the entire circumference of the endless rails, and when in motion are held down at one end of the loops constituting the rails, and are raised up and pass over to the other end of the same. The series of trucks and connecting-straps are in perfect balance and are moved as easily as a large fly-wheel, and the whole machine is easily handled and moved from place to place, and is adapted to all kinds of agricultural work as well as to running over common roads.

What I claim as my invention, and desire to secure by Letters Patent, is—

1. In a traction-engine, the frames having upturned ends and posts, said posts and ends being secured in relative position by bolts, one of each pair of which is the axis of a wheel, in combination with the wheels and connecting-straps and with endless rails held in parallel position by the ties, substantially as set forth.

2. In a traction-engine, the frames having upturned ends and posts, said ends and posts being secured in relative position by bolts, one of each pair of which is the axis of a wheel, in combination with the wheels and connecting-straps and bolts connecting the posts, and with endless rails held in parallel position by the ties, substantially as set forth.

3. In a traction-engine, the frames bent or rounded at their lower outer corners to permit turning, in combination with the wheels supported therein, the connecting-straps, and the endless tracks, substantially as set forth.

GOLDSBURY HARDEN POND.

Witnesses:
H. M. POND,
E. WILEND.